(12) United States Patent
Becchetti

(10) Patent No.: US 11,290,687 B1
(45) Date of Patent: Mar. 29, 2022

(54) SYSTEMS AND METHODS OF MULTIPLE USER VIDEO LIVE STREAMING SESSION CONTROL

(71) Applicant: ZWEB HOLDING LIMITED, St Peter Port (GG)

(72) Inventor: Francesco Becchetti, London (GB)

(73) Assignee: ZWEB HOLDING LIMITED, St Peter Port (GG)

( * ) Notice: Subject to any disclaimer, the term of this patent is extended or adjusted under 35 U.S.C. 154(b) by 0 days.

(21) Appl. No.: 17/133,335

(22) Filed: Dec. 23, 2020

Related U.S. Application Data

(60) Provisional application No. 63/109,664, filed on Nov. 4, 2020.

(51) Int. Cl.
| | |
|---|---|
| *H04N 7/15* | (2006.01) |
| *H04N 7/14* | (2006.01) |
| *G06F 3/0486* | (2013.01) |
| *H04L 29/06* | (2006.01) |
| *G06F 3/04817* | (2022.01) |
| *H04N 21/44* | (2011.01) |
| *H04N 21/2187* | (2011.01) |
| *G06F 3/0482* | (2013.01) |

(52) U.S. Cl.
CPC ............ *H04N 7/155* (2013.01); *G06F 3/0482* (2013.01); *G06F 3/0486* (2013.01); *G06F 3/04817* (2013.01); *H04L 63/0876* (2013.01); *H04N 7/147* (2013.01); *H04N 21/2187* (2013.01); *H04N 21/44* (2013.01)

(58) Field of Classification Search
CPC ............ H04N 7/15; H04N 7/14; H04N 21/44; H04N 21/2187; G06F 3/0486; G06F 3/0481; H04L 29/06; H04L 12/1822

USPC ............................................ 348/14.01–14.16
See application file for complete search history.

(56) References Cited

U.S. PATENT DOCUMENTS

| | | | | |
|---|---|---|---|---|
| 2003/0214574 A1 * | 11/2003 | Saruhashi | ............... | H04N 7/148 348/14.01 |
| 2007/0067387 A1 * | 3/2007 | Jain | ........................ | G06Q 10/10 709/204 |
| 2008/0291013 A1 * | 11/2008 | McCown | ............... | H04L 9/3271 340/539.13 |
| 2013/0254708 A1 | 9/2013 | Dorcey | | |

(Continued)

OTHER PUBLICATIONS

Communication dated Jun. 16, 2021, from the European Patent Office in counterpart European Application No. 20217216.9.

*Primary Examiner* — Melur Ramakrishnaiah
(74) *Attorney, Agent, or Firm* — Arent Fox LLP

(57) ABSTRACT

Examples described herein generally relate to a system and methods for providing a live multi-user video session. Access to the live video session may be limited and user devices may be moved between waiting rooms and the live session. The system may provide a first set of credentials to a first user device upon receiving a request from the user device to participate in the live video session. The first set of credentials allows the first user device to have access to a first separate video session different from the live video session. The system may place the first user device into the first separate video session. The system may provide a second set of credentials to the first user device. The second set of credentials allows the user device to have access to the live video session after the user device has been placed into the separate video session.

26 Claims, 7 Drawing Sheets

(56) References Cited

U.S. PATENT DOCUMENTS

| | | | |
|---|---|---|---|
| 2016/0027134 A1* | 1/2016 | Alvarado | H04N 7/15 |
| | | | 705/311 |
| 2016/0234264 A1 | 8/2016 | Coffman et al. | |
| 2019/0007227 A1* | 1/2019 | Ferreira | H04L 63/107 |
| 2020/0351562 A1* | 11/2020 | Siddique | H04L 12/1822 |

* cited by examiner

SYSTEMS AND METHODS OF MULTIPLE USER VIDEO LIVE STREAMING SESSION CONTROL

CROSS-REFERENCE TO RELATED APPLICATIONS

This application claims priority to U.S. Provisional Application No. 63/109,664 titled "SYSTEMS AND METHODS OF MULTIPLE USER VIDEO LIVE STREAMING SESSION CONTROL," filed Nov. 4, 2020, which is assigned to the assignee hereof, and incorporated herein by reference in its entirety.

TECHNICAL FIELD

The present disclosure relates to multi-party communication systems, and particularly to access control for multiple user live video streaming sessions.

BACKGROUND

Existing multi-party communication systems may allow multiple parties to communicate concurrently. For example, a conference call may allow audio communication, and video calls add one or more video streams (allowing for audio-video communication). For example, video application programming interface (API) platforms provide capabilities to embed real-time, high-quality interactive audio-video communications, messaging, screen-sharing, and the like into web and mobile apps. One issue with video calls is that as the number of participants increases coordination among participants becomes more difficult. For example, multiple participants may attempt to talk at the same time. Additionally, multiple video streams from different participants may consume large amounts of network bandwidth. For participants, multiple video streams may be difficult to display on a screen, particularly for smaller devices such as mobile phones.

One approach to regulating multi-party video sessions is to designate a limited number of participants and designate other users as viewers. This approach, however, requires advance selection of the participants. Accordingly, the other users may have no opportunity to actively participate in the video session. Further, some designated participants may become inactive or disconnected and no longer contribute to the video session, but there may be no mechanism to replace such participants.

Thus, there is a need in the art for improvements in multi-party communication systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present aspects relate to systems and methods for access control in multi-party communication systems that allows for dynamic changes of the participants.

In an example, the disclosure provides a computer-implemented method for providing remote access control to participate in a live video session for a plurality of user devices. The method may include providing a first set of credentials to a first user device upon receiving a request from the user device to participate in the live video session, wherein the first set of credentials allows the first user device to have access to a first separate video session different from the live video session. The method may include placing the first user device into the first separate video session. The method may include providing a second set of credentials to the first user device, wherein the second set of credentials allows the user device to have access to the live video session after the user device has been placed into the separate video session.

In some aspects, the method may further include receiving a video stream for the separate video session that includes a video stream generated by the user device; and presenting the video stream on a user interface.

In some aspects, providing the second set of credentials to the user device is in response to a selection of the user device from the user interface.

In some aspects, the user interface includes a first portion that displays a video stream of the live video session and a second portion that displays the video stream for the separate video session.

In some aspects, the selection of the user device from the user interface includes dragging a user device stream from the second portion to the first portion.

In some aspects, the selection of the user device from the user interface includes selection of a menu option associated with the user device in the second portion.

In some aspects, the method further includes generating a video stream control command to the first user device in response to selection of a control icon associated with the first user device on the user interface.

In some aspects, the method further includes broadcasting a video stream of the live session to a plurality of user devices that are not in the live session.

In some aspects, broadcasting the video stream of the live session comprises transcoding a video format of the video stream.

In some aspects, the method further includes providing a third set of credentials to a second user device upon receiving a request from the second user device to participate in the live video session, wherein the third set of credentials allows the second user device to have access to a second separate video session.

In some aspects, selection of the second separate video session is in response to determining that the first separate video session has reached a capacity limit.

In some aspects, selection of the second separate video session is in response to a characteristic of the second user device matching a characteristic of the second separate video session.

The disclosure also provides an apparatus (e.g., server) including a processor; and a memory coupled with the processor. The memory includes instructions executable by the processor to cause the apparatus to provide remote access control for a plurality of user devices to participate in a live video session. The processor is configured to provide a first set of credentials to a first user device upon receiving a request from the user device to participate in the live video session, wherein the first set of credentials allows the first user device to have access to a first separate video session different from the live video session. The processor is configured to place the first user device into the first separate video session. The processor is configured to provide a second set of credentials to the first user device, wherein the second set of credentials allows the user device to have access to the live video session after the user device has been placed into the separate video session.

The apparatus (server) may be configured to perform the aspects of the method described above.

The disclosure provides a non-transitory computer-readable medium storing computer executable code, the code when executed by a processor causes the processor to provide remote access control to participate in a live video session for a plurality of user devices. The non-transitory computer-readable medium includes code to provide a first set of credentials to a first user device upon receiving a request from the user device to participate in the live video session, wherein the first set of credentials allows the first user device to have access to a first separate video session different from the live video session. The non-transitory computer-readable medium includes code to place the first user device into the first separate video session. The non-transitory computer-readable medium includes code to provide a second set of credentials to the first user device, wherein the second set of credentials allows the user device to have access to the live video session after the user device has been placed into the separate video session.

The non-transitory computer-readable medium may include code to perform the aspects of the method described above.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
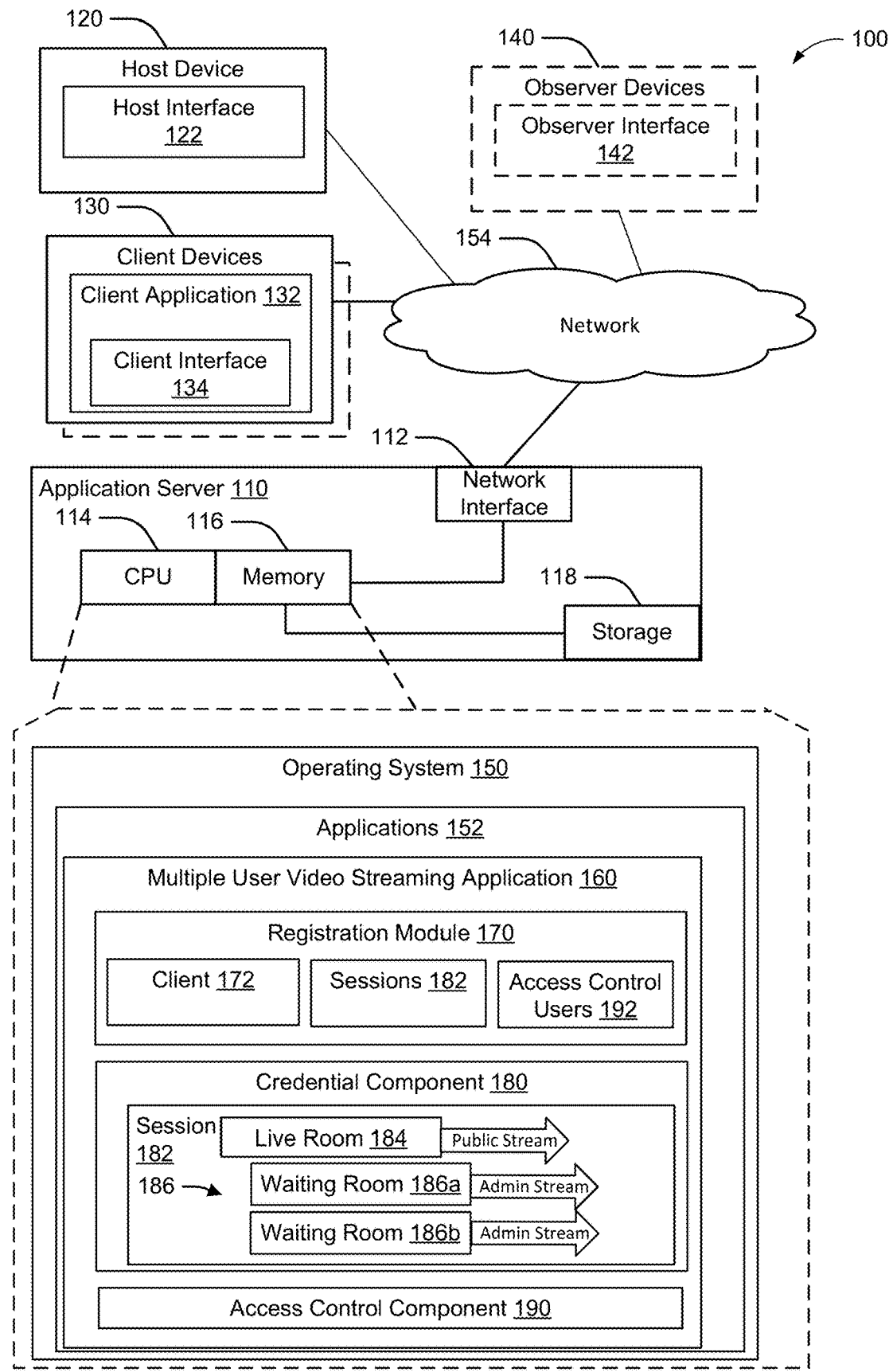
FIG. 1 is a diagram of an example computer system for providing a multiple user video live streaming system, in accordance with an implementation of the present disclosure.

The present disclosure provides systems and methods for providing access control to a multiple user video live streaming session. Within a live streaming session, an audio-video live communication between multiple users may occur. A session may be considered as a "room" where a plurality of clients related to the users can interact with one another in real-time. For example, the multiple user video streaming session may be a video battle because the multiple user video streaming session may allow users to simultaneously present competing views in real-time. The disclosure provides techniques that allow an application provider to dynamically control access to the multiple user video streaming session. In particular, the multiple user video streaming system may generate one or more waiting rooms (waiting sessions) that are subordinate video streaming sessions for a live streaming session. The multiple user video streaming system may provide an access control user interface that allows a host to move users (clients) between the waiting rooms and the live streaming session. Users (clients) may request to join the live streaming session, but may not have direct access to the live streaming session. Accordingly, the host may control participation in the live streaming session and delay access to an ongoing live streaming session by re-directing a live session join or participation request to temporarily move the user (client) to a waiting room. In some aspects, the moving of a user between a waiting room and the live streaming session may generate a request for credentials for the user to enter the live streaming session. The host may receive the credentials and automatically forward the credentials to the user. A client (such as a browser or mobile) application on the user device may use the credentials to join the live video streaming session.

The client(s) (e.g., at the client devices below) and the server (e.g., application server, video session server below) are two components that make up a live video application, and the client(s) may be responsible for live video functionality, such as connecting to a session, publishing and subscribing to stream(s) (e.g. a single audio-video signal, which may include a user's published camera and microphone feed), listening for session events, and dispatching events to the session.

The credentials may include a session ID and/or a token which are obtained by the clients(s) from the server to initialize and connect to the session. A token may be considered as a unique authentication "key" that allows a client to join a session. When a client attempts to join a session, the server may generate a unique token and sends it to the client along with the session ID. Tokens may have expiration dates (specified by the server), whereas sessions may not expire. Tokens can also be assigned roles which determine the permissions of the client, such as publishing streams (contributing an audio-video stream to the session using, e.g., the device's webcam and microphone) and subscribing to streams in the session. Further, the credentials may only be stored temporarily (in-memory) in the user devices. The credentials have a short expiration and only work for a particular waiting room/session or live room/session.

Referring now to FIG. 1, an example video streaming system 100 includes a central application server 110 and a plurality of user devices including at least one host device 120, a plurality of client devices 130 (having clients for publishing audio-video streams to a session), and optional observer devices 140 (having clients for subscribing to audio-video streams). The application server 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing communications related data. In an aspect, the application server 110 may be implemented as one or more virtual machines hosted by a web services provider.

In an aspect, the video streaming system 100 may include a multiple user video streaming (e.g., a video battle) application 160 executed by the application server 110 that the video streaming system 100 operates to host one or more live multi-party video sessions 182. In some aspects, a live multi-party video session 182 may be focused on a first client (e.g., a user being connected in a network to more than a predetermined number of other users), who may be associated with a first client device 130 that starts the live multi-party video session 182.

The multiple user video streaming application 160 may include a registration module 170 configured to obtain and store information regarding clients 172, sessions 182, and access control users 192. For example, each client 172 may be associated with a user identifier (ID), such as but not limited to a username. The user ID may be associated with a user profile, which may include information about the client 172, such as but not limited to demographic information and interests. The clients 172 may each use a client device 130 to view and/or join a session 182, as described in further detail below. A session 182 may be a live video session and may be associated with credentials such as a session ID and/or a token (see above), and may also be associated with an address of the session (e.g., a uniform resource locator (URL)). The session 182 may be advertised on the client interface 134, which may be a graphical user interface presented on a display. An access control user 192 may be a user account that may access an access control interface such as host interface 122, which may be a graphical user interface presented on a display. The registration module 170 may store account information for access control users 192 and control access to the access control component 190 based on the account information.

The multiple user video streaming application 160 may include a credential component 180 that provides credentials (such as session ID and/or token) for joining (connecting to) a session 182. In an aspect, each session 182 may be associated with a live room 184 and one or more waiting rooms 186. The live room 184 may be a live room for a video battle. The live room 184 may be a live multi-party video session that is broadcast to an audience as a public stream. The live room 184 may have a limited number of clients. For example, in some aspects, the live room 184 may be limited to 4 or 5 clients, although in some aspects, up to 10 clients may be permitted. The number of clients in the live room may be configurable although a technical limit of clients (e.g., 50) may be based on a communications protocol. Generally, a client device 130 is not allowed direct access to the live room 184. Instead, upon requesting to join the session 182, the client device 130 is assigned to a waiting room 186.

The waiting rooms 186 may each be a subordinate video session (e.g., waiting room 186a and waiting room 186b). The waiting rooms 186 may have a limited number of clients based on the technical limit of the communications protocol. Clients 172 in a waiting room 186 may provide a video stream, which may be viewed by an access control user 192 at the host device 120. The access control user 192 may allow clients 172 to receive a session stream for the waiting room 186. For example, the session stream for the waiting room 186 may be provided to clients 172 such as client devices 130 and observer devices 140. Access to the live room 184 and the waiting rooms 186 may be based on different credentials. Each of the live room 184 and the waiting rooms 186 may be a separate video session. In order for a client 172 to connect and join a video session, the client 172 at the client device 130 may be provided with a user-specific and session-specific credential for the video session. The credential component 180 may generate the credentials for each client 172 based on the room assigned to the client 172.

The multiple user video streaming application 160 may include an access control component 190 that provides access control features to the host device 120. The access control component 190 may allow an access control user 192 to move a client 172 between the live room 184 and one of the waiting rooms 186. In particular, the access control component 190 may provide the user interface 300 described below with respect to FIG. 3.

The application server 110 may include a central processing unit (CPU) 114 that executes instructions stored in memory 116. For example, the CPU 114 may execute an operating system 150 and one or more applications 152, which may include the multiple user video streaming application 160. The application server 110 may also include a network interface 112 for communication with external devices via a network 154. For example, the application server 110 may communicate with a plurality of user devices including the host device 120, client devices 130, and observer device 140.

Memory 116 may be configured for storing data and/or computer-executable instructions defining and/or associated with an operating system 150 and/or application 152, and CPU 114 may execute operating system 150 and/or applications 152. Memory 116 may represent one or more hardware memory devices accessible to application server 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an aspect, the memory 116 may include or communicate with a storage device 118, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads. In an aspect, a graphics processing unit (GPU) may perform some operations of the CPU 114.

The operating system 150 may include instructions (such as applications 152) stored in memory 116 and executable by the CPU 114. The applications 152 may include a multiple user video streaming application 160 configured to communicate with user devices via a respective interface (e.g., host interface 122, client interface 134, and observer interface 142). The multiple user video streaming application 160 may provide the host interface 122 that may be in communication with or otherwise operate in conjunction with a host device 120. The host interface 122 may be a graphical user interface (GUI) with which an end user may interact. For example, the host interface 122 may be a web-page that is accessed through a browser application executed on the host device 120. By loading the web-page, the browser application may effectively operate as a user interface for an application executed on the application server 110 (e.g., in the case of a web server). As another example, the host interface 122 may be an application or operating system that runs on the host device 120.

The multiple user video streaming application 160 may also provide the client interface 134 that may be in communication with or otherwise operate in conjunction with a client device 130. The client interface 134 may be any user interface with which an end user may interact. For example, the client interface 134 may be a web-page that is accessed through a browser application (client) executed on the client device 130. By loading the web-page, the browser application may effectively operate as a user interface for an application executed on the application server 110 (e.g., in the case of a web server). Such an aspect may allow various types of user devices to serve as a client device 130 and participate in a communication session. For example, a communication session may include different types of client devices 130 such as desktop computers, laptop computers, tablets, and smart phones. In an aspect, the client interface 134 may be provided by a client application 132, which may be a stand-alone application installed on the client device 130. In some aspects, the identifier of the client 172 may be associated with an identification of the client application 132 or an account that acquired the client application 132.

In some optional aspects, the multiple user video streaming application 160 may also provide the observer interface 142 that may be in communication with or otherwise operate in conjunction with an observer device 140. Similar to the client interface 134, the observer interface 142 may be web-page that is accessed through a browser application executed on the observer device 140 or a stand-alone application. In some aspects, the observer device 140 may be a client device 130 that requests to receive a video stream of the live video session or the waiting room session but does not request to join the live video session. The observer interface 142 may allow an observer to view the live video session or the waiting room session. In some aspects, the live video stream may be broadcast via various media including over the air or cable. The observer device 140 may include a television that receives the broadcast.

Figure 2:
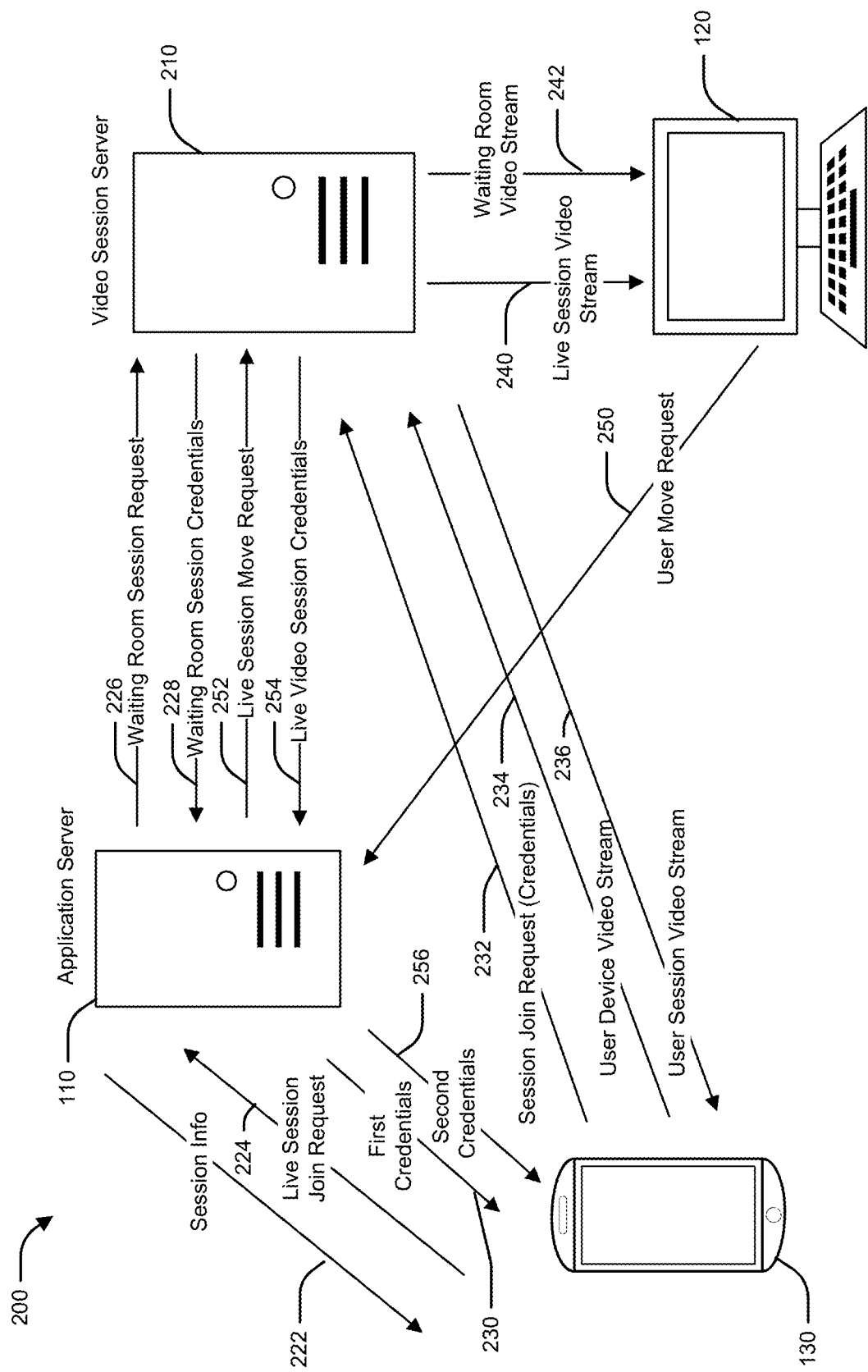
FIG. 2 is an example message diagram illustrating example messages for controlling access to the multiple user video live streaming system, in accordance with an implementation of the present disclosure.

FIG. 2 is an example message diagram 200 illustrating example messages for controlling access to the multiple user video battle live streaming system 100.

In some aspects, the multiple user video battle live streaming system 100 may include a video session server 210. The video session server 210 may implement a video streaming service. For example, the video session server 210 may provide a video streaming service via one or more communication protocols and/or communication application programming interfaces (APIs). For instance, in some aspects, the video session server 210 may provide video streaming services via the Vonage APIs, which may also be referred to as Nexmo or TokBox. The application server 110 may communicate with the video session server 210 via the APIs. In some aspects, the host device 120 and/or client devices 130 may communicate with the video session server 210 via the application server 110. Some communications such as video streams may be communicated directly between the video session server 210 and the host device 120, client devices 130, and/or observer devices 140. In some aspects, the video session server 210 may be integrated within the application server 110 and messages to the video session server 210 may be implemented as internal function calls.

The application server 110 may transmit session information 222 to each client device 130. The session information 222 may identify one or more sessions 182. For example, the session information 222 may indicate a subject, a session host, a start time, and a duration of the session 182. The application server 110 may transmit session information 222 via a secure connection with the client device 130 (e.g., hypertext transfer protocol secure (HTTPS)). The session information 222 may be provided in response to a query from the client device 130.

The client device 130 may transmit a live session join request 224. The live session join request 224 may identify a session 182. As noted above, the session 182 may be associated with a live room 184 and one or more waiting rooms 186. In some implementations, the client device 130 may generate a live session join request 224 including a session ID of the live room 184. In response to receiving the live session join request 224, the application server 110 may, in order to provide access control, not forward this request to the video session server, but may replace this request with a waiting room session request 226 for the client device 130 to be transmitted to the video session server 210. The waiting room session request 226 may include a session ID of the waiting room 186. In some implementations, the client device 130 may generate a live session join request 224 including a session ID of the waiting room 186, and the application server 110 may forward the live session join request 224 including the session ID of the waiting room 186 as the waiting room session request 226. In some aspects, the application server 110 may select a first available waiting room for the client device 130. If all waiting rooms are full, the application server 110 may generate a new waiting room. In some aspects, the application server 110 may select a waiting room for the client device 130 based on a characteristic of the client device 130 or an account associated with the client device 130. For example, the application server 110 may select a waiting room based on device type, network type, geographic location, or demographic information. The video session server 210 may return waiting room session credentials 228 (waiting room session ID and/or waiting room token) to the application server 110 in response to the waiting room session request 226. The application server 110 may forward the waiting room session credentials 228 to the client device 130 as first credentials 230. The client application 132 executing on the client device 130 may transmit a session join request 232 including the first credentials 230 to the video session server 210. The video session server 210 may admit the client device 130 into the waiting room video session. The client device 130 may transmit a user device video stream 234 to the video session server 210, for example based on the waiting room token. The user device video stream 234 may be a video stream generated by the client device 130, for example, by a camera and microphone of the client device 130. The video session server 210 may transmit a user session video stream 236 to the client device 130. The user session video stream 236 may include one or more user device video streams. For example, the video session server 210 may arrange the user device video streams 234 from multiple client devices 130 in the same session into a pattern (e.g., a grid) to generate the user session video stream 236.

The video session server 210 may generate a user session video stream for each session including a live session video stream 240 for the live room 184 and a waiting room video stream 242 for each waiting room 186. The video session server 210 may provide the live session video stream 240 and each waiting room video stream 242 to the host device 120. As discussed in further detail below, the host device 120 may include a user interface 300 that allows an access control user to simultaneously view the live session video stream 240 and at least one waiting room video stream 242. The access control user, via the user interface 300, may move a client device 130 between waiting rooms 186 or from a waiting room 186 to the live room 184. The host device 120 may transmit a user move request 250 to the application server 110. The user move request 250 may include a client ID and/or the credentials (session ID and/or token) of the selected waiting room 186 or the live room 184. If the user move request 250 is for a new waiting room 186, the application server 110 may generate a waiting room session request 226 as described above. If the user move request 250 is for the live room 184, the application server 110 may send a live session move request 252 to the video session server 210. The video session server 210 may respond to the live session move request 252 by sending live video session credentials 254 for the client device 130 to the application server 110. The application server 110 may forward the live video session credentials 254 to the client device 130 as second credentials 256. The client device 130 may then join the live room 184 using the second credentials 256 in the same manner as joining the waiting room 186 using the first credentials 230. That is, the process for joining a session is transparent to the client device 130. The session joined by the client device 130 is dependent upon the first credentials 230 supplied by the application server 110. Accordingly, the ability of the client device 130 to join the live room 184 is under the control of the host device 120 rather than based on connection speed. Further, the use of the waiting rooms 186 may prevent client devices from transmitting repeated requests attempting to join the live session, thereby reducing the processing load for the application server 110 and/or the video session server 210.

Figure 3:
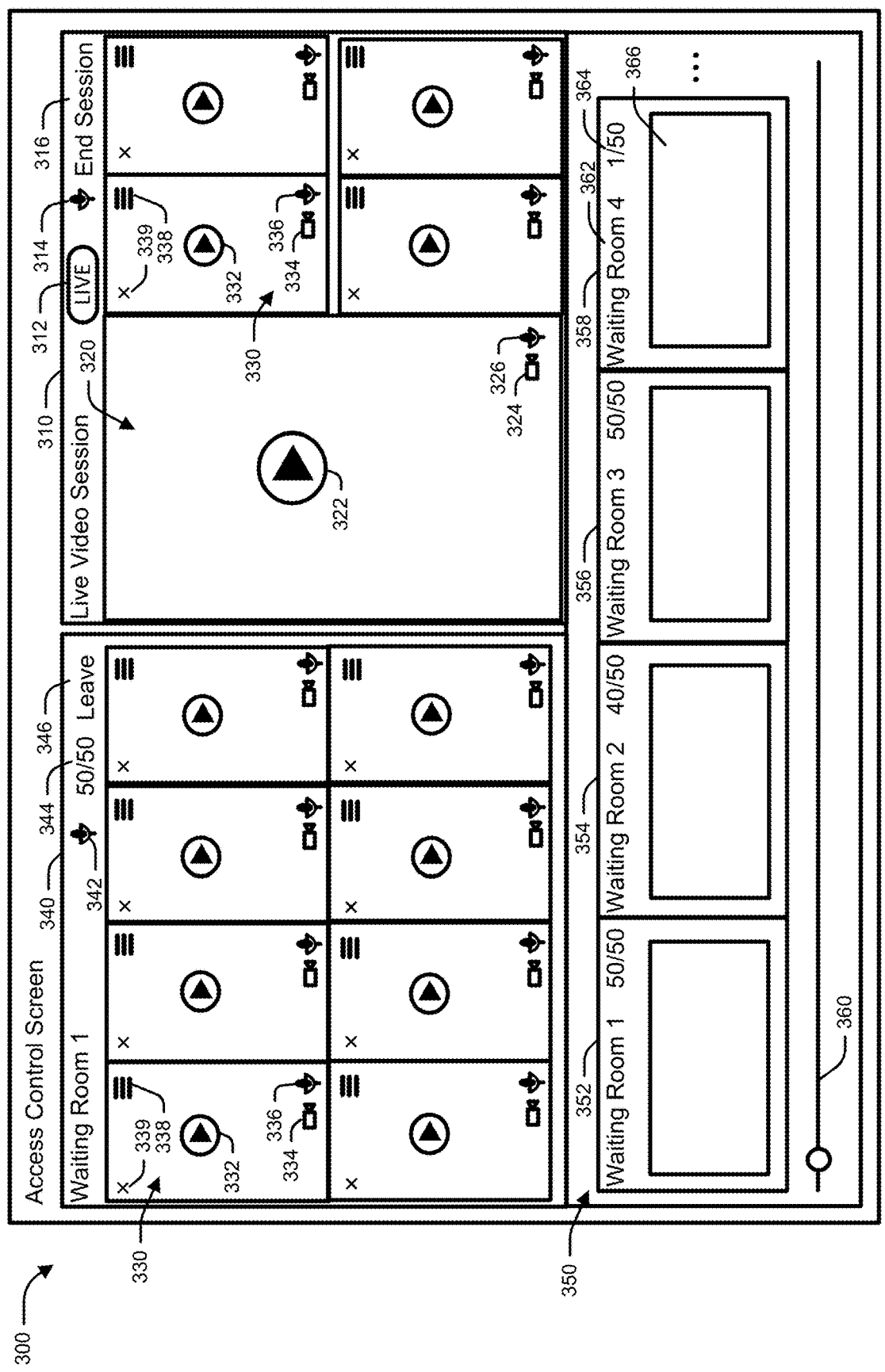
FIG. 3 is an example user interface for administering a multiple user video live streaming session.

FIG. 3 is an example user interface 300 for administering a multiple user video battle live streaming session. The user interface 300 may be presented on the host device 120. The user interface 300 may include a live video session portion 310, a waiting room session portion 340, and a waiting room selection portion 350.

The live video session portion 310 may allow an access control user at the host device 120 to control the live video session. For example, the access control user may be a producer that selects the content of the live video session. The live video session portion 310 may include a live control 312, a mute control 314, and an end session control 316. The live control 312 may control broadcast of the live video session. For example, when the live control 312 is selected, the live session video stream may be broadcasted. The mute control 314 may mute audio for the live video session. For example, the mute control 314 may be used to limit content that cannot be broadcast. The end session control 316 may end the live video session. For example, in response to the access control user selecting the end session control 316, the session 182 may be terminated and all clients may be removed from the live room 184 and the waiting rooms 186.

The live video session portion 310 may also include individual video stream controls. In some aspects, the live video session portion 310 includes an influencer stream panel 320. The influencer stream panel 320 may be associated with a participant that has been identified as an influencer. For example, an influencer may be associated with the participant device 130 that initiated or requested the live video session. The influencer stream panel 320 may include a play control 322, a video control 324, and a mute control 326. The play control 322 may control whether the user device video stream 234 from the influencer plays on the user interface 300. The video control 324 may determine whether the user device video stream 234 is broadcast in the live session video stream. The mute control 326 may control whether an audio portion of the user device video stream 234 is broadcast in the live session video stream. In some aspects, the mute control 326 may mute the client device 130 associated with the user device video stream. For example, the mute control 326 may generate a communication layer signal (e.g., websocket) to switch the microphone of the client device 130 on or off.

The live video session portion 310 may also include individual client control panels 330. For example, the live video session portion 310 may include an individual client control panel 330 for each client device 130 admitted to the live room 184. Each individual client control panel 330 may include a play control 332, video control 334, and mute control 336 that operate in a similar manner to the play control 322, video control 324, and mute control 326 described above. Each individual client control panel 330 may include a room select control 338. In some aspects, the room select control 338 may allow the individual client control panel 330 to be selected and dragged to a panel for a different room (e.g., to a waiting room 186). In other aspects, the room select control 338 may generate a menu including options to move the client device 130 to a different room. Each individual client control panel 330 may include a client remove control 339. Selection of the client remove control 339 may disconnect the client device 130 from the current session.

The waiting room session portion 340 may provide a display of the waiting room 186 to the access control user on the host device 120. For example, the display of the waiting room 186 may include all or a portion of the waiting room video stream 242. In some aspects, the access control user may view a single waiting room at one time. The waiting room session portion 340 may include a mute control 342, a capacity indication 344, and a leave control 346. The mute control 342 may control whether audio of the waiting room video stream 242 is played at the host device 120. The capacity indication 344 may indicate a maximum capacity and a current number of clients. The leave control 346 may remove the access control user from the waiting room session. The waiting room session portion 340 may also include individual client control panels 330, which may operate in the same manner as the individual client control panels 330 in the live video session portion 310. In some aspects, the mute control 336 for clients in the waiting room session portion 340 may default to muted.

The waiting room selection portion 350 may allow the access control user to select a waiting room to be displayed in the waiting room session portion. The waiting room selection portion 350 may include a panel 352, 354, 356, 358 for each waiting room 186. The panel may display a name or number of the waiting room 362 and/or a capacity indication 364. In some aspects, the panel may include a thumbnail view 366 of the waiting room video stream 242, which may be a single frame that is updated periodically. The waiting room selection portion 350 may include a scroll bar 360 that allows for viewing of additional waiting room panels.

Figure 4:
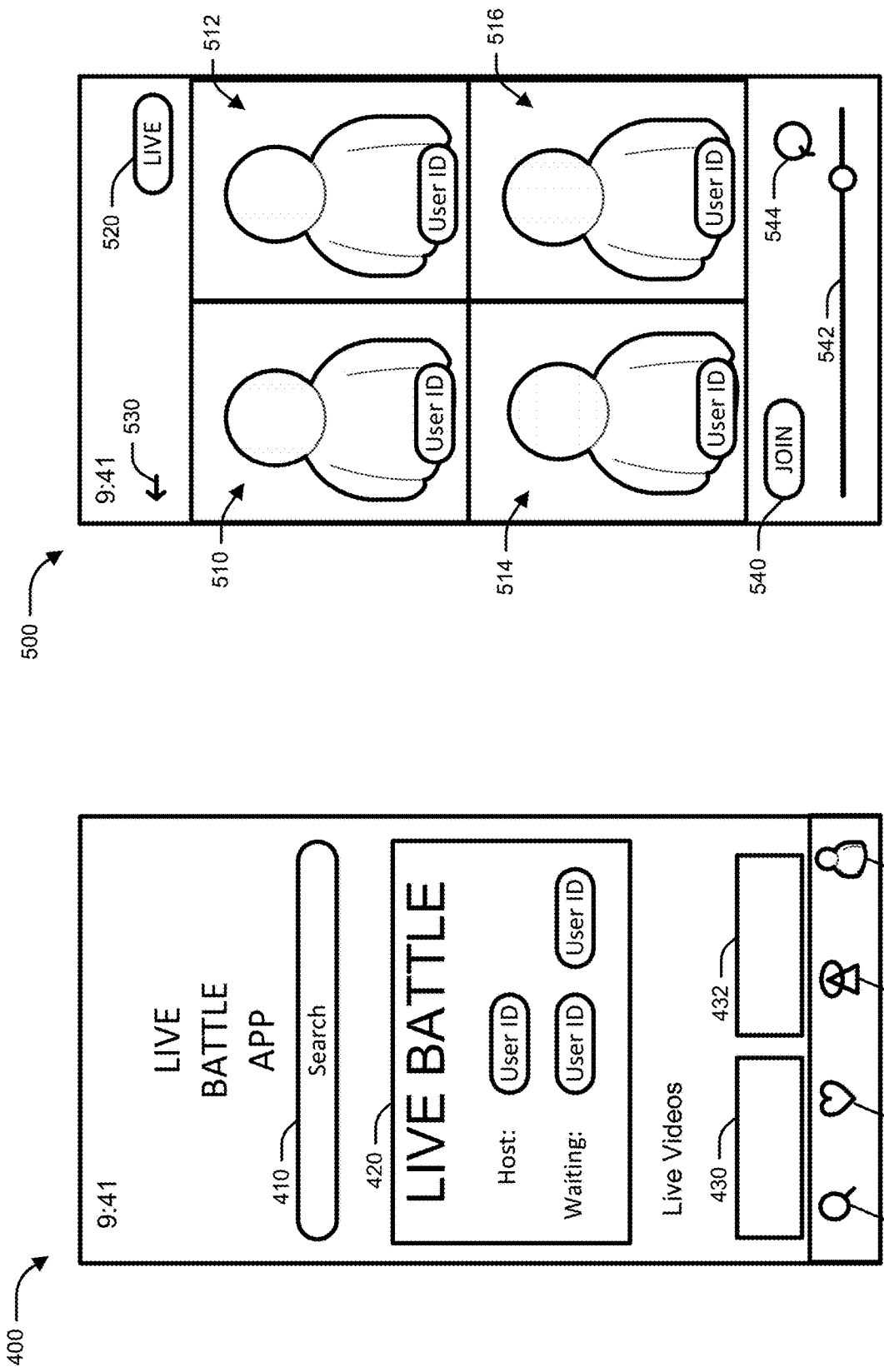
FIG. 4 is an example client interface for selecting a multiple user video live streaming session, in accordance with an implementation of the present disclosure.

FIG. 4 is an example user interface 400 for selecting a multiple user video battle live streaming session. The user interface 400 may be generated by the client application 132 and may correspond to the client interface 134. The user interface 400 may include a search field 410, a live video session notification 420, and live video stream options 430, 432. The search field 410 may allow a client to enter search text and search for a live video session. The live video session notification 420 may display information about a live video session such as a user ID of a host or an influencer, a user ID other clients that have joined the live video session, and a start time. In some implementations, the live video session notification 420 may provide information about a waiting room 186 associated with the live video session. For example, the live video session notification 420 may display one or more user IDs of clients that have joined the waiting room 186. For example, the live video session notification 420 may display a rotating list of the user IDs. Accordingly, the user interface 400 may allow clients using the multiple user video streaming application 160 to view who is joining the waiting room 186. The live video session notification 420 may be a link to view the live video session. The user interface 400 may include links to additional features or interfaces. For example, the user interface 400 may include a search icon 440, a favorites icon 442, a ranking icon 444, and a profile icon 446.

Figure 5:
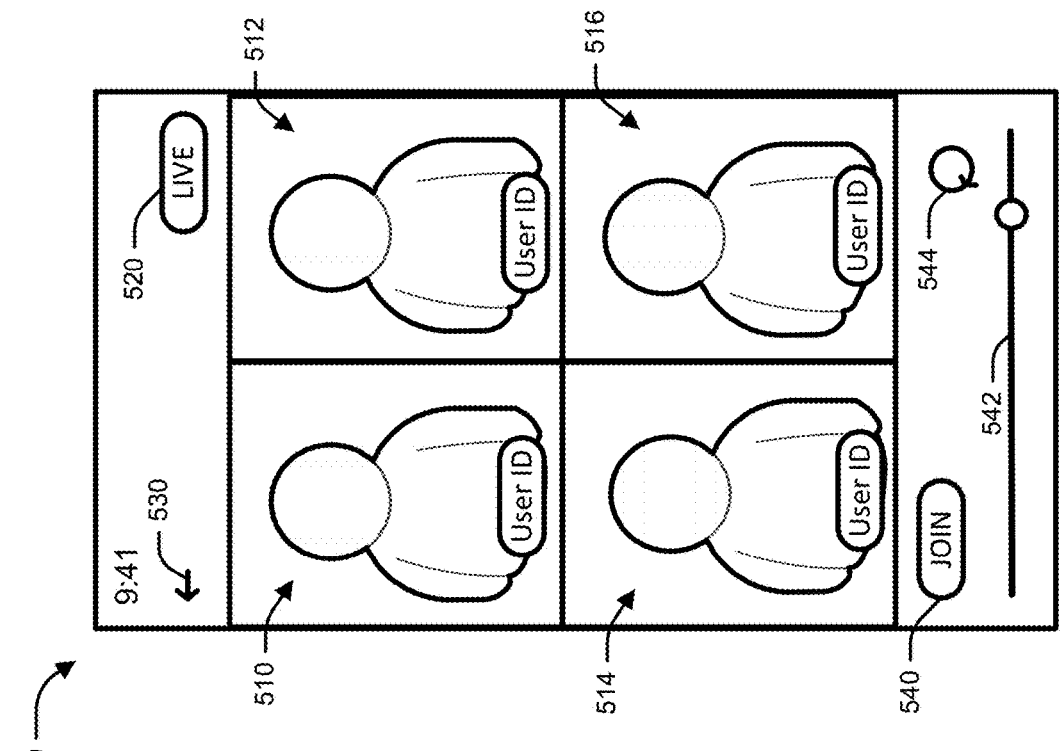
FIG. 5 is an example client interface for viewing a multiple user video live streaming session, in accordance with an implementation of the present disclosure.

FIG. 5 is an example user interface 500 for viewing a multiple user video battle live streaming session or a waiting room streaming session. The user interface 500 may be presented in response to a user selecting the live video session notification 420 in the user interface 400. The user interface 500 may display a live session video stream 240. The live session video stream 240 may include a plurality of component video streams 510, 512, 514, 516, each generated from a user device video stream 234. Each component video stream 510, 512, 514, 516 may be associated with client information such as a user ID of the client 172 that generated the user device video stream 234. The user interface 500 may include a live indication 520 that indicates whether the video session is live. The user interface 500 may include a navigation control 530 that may return to the user interface 400. The user interface 500 may include a join button 540 that generates a request for the client device 130 to join the live video session. That is, the join button 540 may generate the live session join request 224 described above with respect to FIG. 2. The user interface 500 may include a progress bar 542 that may allow a user to return to an earlier time in the video stream and a refresh control 544 that may return the user to the current time of the live video stream.

Figure 6:
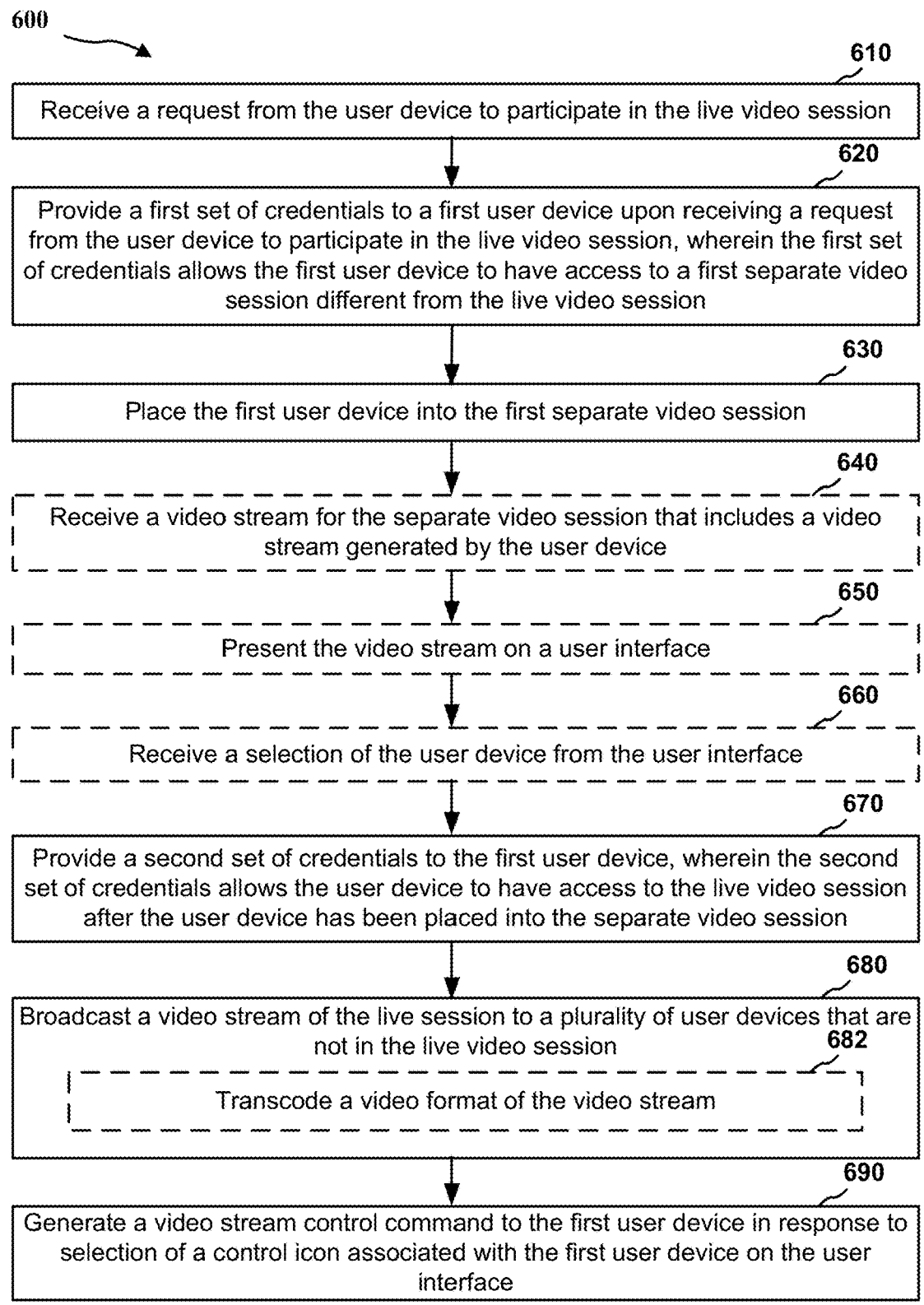
FIG. 6 is a flowchart of an example method of controlling access to a live video session, in accordance with an implementation of the present disclosure.

FIG. 6 is a flowchart of an example method 600 of controlling access to a live video session. The method 600 may be performed by the application server 110 including the CPU 114 executing the multiple user video streaming application 160.

At block 610, the method 600 may include receiving a request from a first user device to participate in the live video session. For example, a client device 130 may transmit the live session join request 224. The live session join request 224 may include an identifier of a session 182. The identifier of the session 182 may be different than an identifier of the live room 184.

At block 620, the method 600 may include providing a first set of credentials (e.g. first session ID and first token) to the first user device upon receiving the request from the first user device to participate in the live video session. Participating in the live video session may be considered as publishing or contributing an audio-video stream to the live room session (of a plurality of other user devices) using the first user device's webcam and microphone. In an aspect, for example, the application server 110 may provide the first credentials 230 upon receiving the live session join request 224. In some aspects, the application server 110 may request the first credentials 230 from the video session server by transmitting the waiting room session request 226 and receiving the waiting room session credentials 228. In other aspects, the application server 110 may generate the first credentials 230. The first set of credentials (e.g., first session ID and first token) allows the first user device to have access to a first separate video session different from the live video session. For example, the first set of credentials 230 (e.g., first session ID and first token) allow the client device 130 to join the waiting room 186, which is a different video session than the live room 184.

At block 630, the method 600 may include placing/connecting the first user device into/to the first separate video session using the first set of credentials. In other words, joining the separate video session or placing the first user device (client) into the first separate video session may be achieved by using the first set of credentials 230 (e.g., first session ID and first token) to initialize a connection to the video session server (e.g., by the session join request 232 in FIG. 2) and connecting the first user device (client) to the separate video session, e.g., the waiting room session. For example, the application server 110 may place the client device 130 in the waiting room 186, i.e., connect the client device 130 to the waiting room session. For instance, the application server 110 may associate a client ID and a connection ID of the client device 130 with a session ID of the waiting room 186. Concurrently, the participant device 130 may transmit the session join request 232 including the first credentials 230 to the video session server 210. Accordingly, the client device 130 may join the waiting room 186 and start streaming the user device video stream 234 and receiving the user session video stream 236 for the waiting room 186.

At block 640, the method 600 may optionally include receiving a video stream for the separate video session that includes a video stream generated by the user device. In an aspect, for example, the application server 110 may receive the waiting room video stream 242. The application server 110 may forward the waiting room video stream 242 to the host device 120. In other aspects, the host device 120 may receive the waiting room video stream directly from the video session server 210.

At block 650, the method 600 may optionally include presenting the video stream on a user interface. For example, the application server 110 may present the waiting room video stream 242 on the host device 120 via the host interface 122 and/or the user interface 300. As another example, the application server 110 may provide the waiting room video stream 242 to a second user device (e.g., client device 130) for display on client interface 134 and/or the user interface 500. The waiting room video stream 242 may include one or more user device video streams 234 of user devices in the waiting room 186a.

At block 660, the method 600 may optionally include receiving a selection of the first user device from the user interface. For example, the application server 110 may receive the first user device move request 250 from the host device 120. The user move request 250 may be generated by selection of the first user device from the user interface 300. For instance, the access control user may select the room select control 338 of a client panel 330 to move the associated client. In some aspects, the room select control 338 may allow the access control user to pick up and drag the client panel 330 to a portion of the user interface 300 for the desired room (e.g., live video session portion 310 or waiting room session portion 340).

In block 670, the method 600 may include providing a second set of credentials to the first user device, in particular in response to the selection of the first user device from the host device 120 in block 660. The second set of credentials (e.g., second session ID and second token, different from the first session ID and first token in block 620) allows the user device to now have access to the live video session after the first user device has been placed into (or connected to) the separate video session. For example, the application server 110 may provide the second credentials 256 to the client device 130. In some aspects, the application server 110 may obtain the second credentials 256 by sending the live session move request 252 to the video session server 210 in response to the user move request 250, and receiving the live video session credentials 254, which may be provided as the second credentials 256. The client device 130 may then join the live room 184 (connect to the live room session) by transmitting the session join request 232 including the second credentials 256 to the video session server 210. In other words, the client device 130 (client) opens a connection to the live room session, and each such connection may be associated with a unique connection ID. The user device video stream 234 may then be added to the live room session 184 (i.e., publish an audio-video stream to the live room session using the first user device's webcam and microphone) and the client device 130 may receive the user session video stream 236 for the live room session (multiple user video live streaming session). That is, the GUI at the host device 120 provides the access control user with a graphical interface to set processing conditions to temporarily re-direct the participating request to a different temporary waiting session and to subsequently connect the user device (client) to the multiple user video live streaming session without the further need of user input at the user device.

At block 680, the method 600 may optionally include broadcasting a video stream of the live video session to a plurality of user devices. For example, the application server 110 may receive the live session video stream 240 from the video session server 210. The access control user at the host device 120 may select the live control 312 to start broadcasting the live session video stream 240. The application server 110 may provide the live session video stream 240 to one or more client device 130 or observer devices 140. In some aspects, the live session video stream 240 may be broadcast as a real-time messaging protocol (RTMP) stream. In some aspects, at sub-block 682, the block 680 may include transcoding a video format of the video stream. The live session video stream 240 from the video session server 210 may not be formatted correctly for display on some user devices or interfaces. For example, the live session video stream 240 may have a 16:9 aspect ratio that may be suitable for computer monitors, televisions, and other larger screens. The user interface 500 however, may have a 9:16 aspect ratio for vertical display. The application server 110 may rotate the live session video stream 240 and transcode the rotated stream for display with a 9:16 aspect ratio.

At block 690, the method 600 may include generating a video stream control command to the first user device in response to selection of a control icon associated with the first user device on the user interface. For example, the host device 120 may receive a selection of a mute control 314, 326, 336, or 342 from the access control user. The host device 120 may generate a video stream control command to transmit to one or more client devices 130 via the application server 110. The video stream control command may control the client application 132 to perform the control (e.g., muting a microphone of the client device 130). A similar control command may be generated based on selection of the video control 324 or 334.

Figure 7:
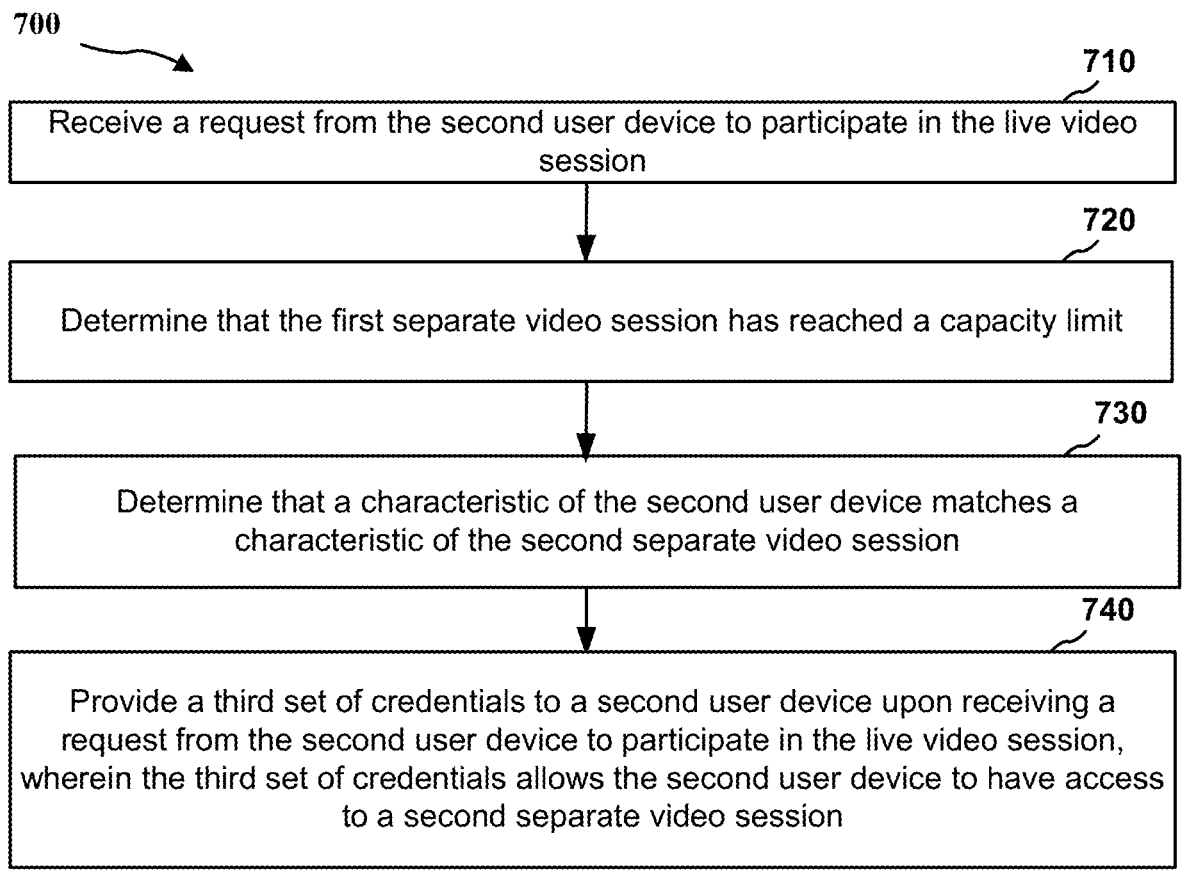
FIG. 7 is a flowchart of an example method of assigning a second user device to a waiting room, in accordance with an implementation of the present disclosure.

FIG. 7 is a flowchart of an example method 700 of adding an additional user device (client) to a live video session. The method 700 may be performed by the application server 110 including the CPU 114 executing the multiple user video streaming application 160. The method 700 may be an extension of the method 600. For example, the method 700 may be performed concurrently with blocks 610, 620, and 630 of the method 600 for a second client device 130.

At block 710, the method 700 may include receiving a request from the second user device to participate in the live video session. For example, a client device 130 may transmit the live session join request 224. The live session join request 224 may include an identifier of a session 182. The identifier of the session 182 may be different than an identifier of the live room 184.

In block 720, the method 700 may optionally include determining that the first separate video session has reached a capacity limit. For instance, the application server 110 may determine that a first waiting room 186 has reached a capacity limit. The application server 110 may generate a second waiting room 186 in response to the determination.

In block 730, the method 700 may optionally include determining that a characteristic of the second user device matches a characteristic of the second separate video session. For instance, in some aspects, when there is available capacity in two or more waiting rooms 186, the application server 110 may select a waiting room based on a matching characteristic. For instance, each waiting room may be associated with a geographic area, preferred language, demographic characteristic, or opinion (e.g., agree, disagree) or choice (e.g., favorite). A waiting room for the second client device 130 may be selected based on a characteristic of the client device 130 or a profile of a user associated therewith that matches the characteristic of the waiting room. Associating waiting rooms with characteristics may enable the access control user to easily select clients for the live room 184.

At block 740, the method 700 may include providing a third set of credentials (third session ID and/or third token, being different from the first and second session ID and the first and second token) to the second user device upon receiving a request from the second user device to participate in the live video session. The third set of credentials allows the second user device to have access to a second separate video session. For example, the second separate video session is a second separate waiting room session.

Figure 8:
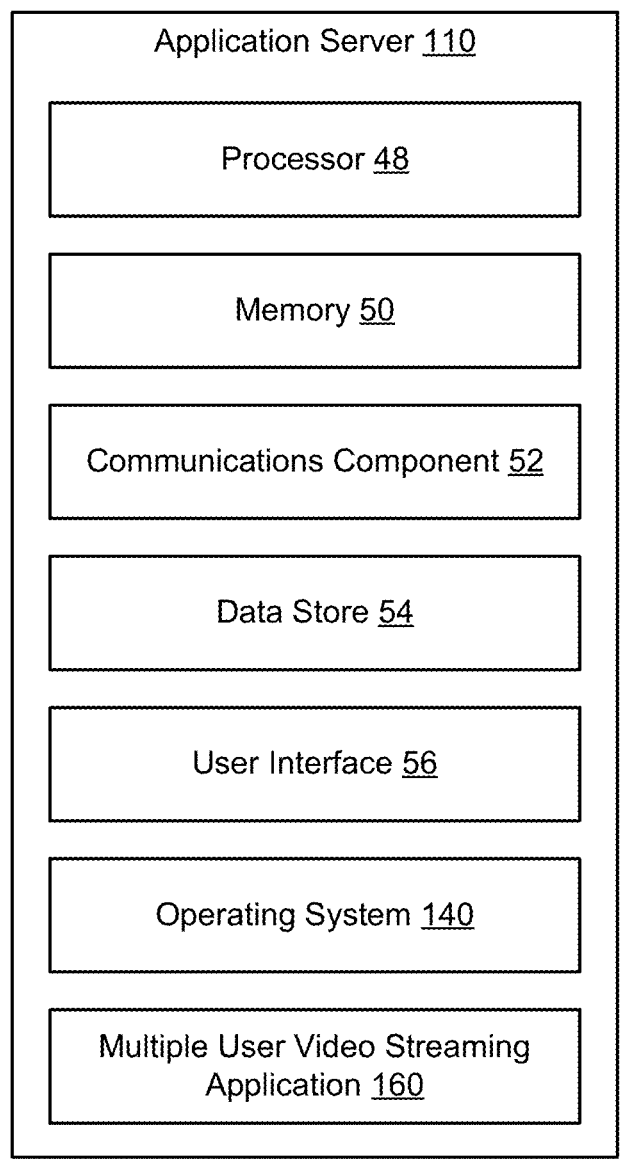
FIG. 8 is a schematic block diagram of an example application server, in accordance with an implementation of the present disclosure.

Referring now to FIG. 8, illustrated is an example application server 110 in accordance with an aspect, including additional component details as compared to FIG. 1. In one example, application server 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an aspect, for example, processor 48 may include CPU 114.

In an example, application server 110 may include memory 50 for storing instructions executable by the processor 48 for carrying out the functions described herein. In an aspect, for example, memory 50 may include memory 116. The memory 50 may include instructions for executing the multiple user video streaming application 160.

Further, application server 110 may include a communications component 52 that provides for establishing and maintaining communications with one or more parties utilizing hardware, software, and services as described herein.

Communications component 52 may carry communications between components on c application server 110, as well as between application server 110 and external devices, such as devices located across a communications network 154 and/or devices serially or locally connected to application server 110. For example, communications component 52 may include one or more buses, and may further include transmit chain components and receive chain components associated with a transmitter and receiver, respectively, operable for interfacing with external devices.

Additionally, application server 110 may include a data store 54, which can be any suitable combination of hardware and/or software, that provides for mass storage of information, databases, and programs employed in connection with aspects described herein. For example, data store 54 may be a data repository for operating system 150 and/or applications 152. The data store may include memory 116 and/or storage device 118.

Application server 110 may also include a user interface component 56 operable to receive inputs from a user of application server 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an aspect, user interface component 56 may transmit and/or receive messages corresponding to the operation of operating system 150 and/or applications 152. In addition, processor 48 may execute operating system 150 and/or applications 152, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Computer-readable media includes computer storage media, which may be referred to as non-transitory computer-readable media. Non-transitory computer-readable media may exclude transitory signals. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or procedure may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with examples disclosed herein.

What is claimed is:

1. A computer-implemented method for providing remote access control for a plurality of user devices to participate in a live video session, comprising:
   providing a first set of credentials to a first user device upon receiving a request from the first user device to participate in the live video session, wherein the first set of credentials allows the first user device to have access to a first separate video session different from the live video session;
   placing the first user device into the first separate video session; and
   providing a second set of credentials to the first user device, wherein the second set of credentials allows the first user device to have access to the live video session after the first user device has been placed into the first separate video session, wherein the first set of credentials includes a first session ID and a first token and the second set of credentials includes a second session ID and a second token being different from the first session ID and the first token.

2. The method of claim 1, further comprising:
   receiving a video stream for the first separate video session that includes a user device stream generated by the first user device; and
   presenting the video stream for the first separate video session on a user interface.

3. The method of claim 2, wherein providing the second set of credentials to the first user device is in response to a selection of the first user device from the user interface.

4. The method of claim 3, wherein the user interface includes a first portion that displays a video stream of the live video session and a second portion that displays the video stream for the first separate video session.

5. The method of claim 4, wherein the selection of the first user device from the user interface includes dragging the user device stream from the second portion to the first portion.

6. The method of claim 4, wherein the selection of the first user device from the user interface includes selection of a menu option associated with the first user device in the second portion.

7. The method of claim 2, further comprising generating a video stream control command to the first user device in response to a selection of a control icon associated with the first user device on the user interface.

8. The method of claim 2, wherein presenting the video stream for the first separate video session on a user interface comprises providing the video stream for the first separate video session to a second user device.

9. The method of claim 8, wherein the video stream for the first separate video session includes one or more user device video streams of user devices in the first separate video session.

10. The method of claim 1, further comprising providing a list of identifiers associated with user devices in the first separate video session a second user device.

11. The method of claim 1, further comprising broadcasting a video stream of the live video session to a plurality of user devices that are not in the live video session.

12. The method of claim 11, wherein broadcasting the video stream of the live video session comprises transcoding a video format of the video stream.

13. The method of claim 1, further comprising:
   providing a third set of credentials to a second user device upon receiving a request from the second user device to participate in the live video session, wherein the third set of credentials allows the second user device to have access to a second separate video session.

14. The method of claim 12, wherein selection of the second separate video session is in response to determining that the first separate video session has reached a capacity limit.

15. The method of claim 12, wherein selection of the second separate video session is in response to a characteristic of the second user device matching a characteristic of the second separate video session.

16. An apparatus for providing remote access control for a plurality of user devices to participate in a live video session, comprising:
   a processor; and
   a memory communicatively coupled with the processor, wherein the memory includes instructions executable by the processor to cause the apparatus to:
      provide a first set of credentials to a first user device upon receiving a request from the first user device to participate in the live video session, wherein the first set of credentials allows the first user device to have access to a first separate video session different from the live video session;
      place the first user device into the first separate video session; and
      provide a second set of credentials to the first user device, wherein the second set of credentials allows the first user device to have access to the live video session after the first user device has been placed into the first separate video session, wherein the first set of credentials includes a first session ID and a first token and the second set of credentials includes a second session ID and a second token being different from the first session ID and the first token.

17. The apparatus of claim 16, wherein the processor is configured to:
receive a video stream for the first separate video session that includes a user device stream generated by the first user device; and
present the video stream for the first separate video session on a user interface.

18. The apparatus of claim 17, wherein the processor is configured to provide the second set of credentials to the first user device is in response to a selection of the first user device from the user interface.

19. The apparatus of claim 18, wherein the user interface includes a first portion that displays a video stream of the live video session and a second portion that displays the video stream for the first separate video session.

20. The apparatus of claim 19, wherein the selection of the first user device from the user interface includes dragging a user device stream from the second portion to the first portion.

21. The apparatus of claim 19, wherein the selection of the first user device from the user interface includes selection of a menu option associated with the first user device in the second portion.

22. The apparatus of claim 16, wherein the processor is further configured to:
provide a third set of credentials to a second user device upon receiving a request from the second user device to participate in the live video session, wherein the third set of credentials allows the second user device to have access to a second separate video session.

23. A non-transitory computer-readable medium storing computer executable code for providing remote access control for a plurality of user devices to participate in a live video session, the code when executed by a processor causes the processor to:
provide a first set of credentials to a first user device upon receiving a request from the first user device to participate in the live video session, wherein the first set of credentials allows the first user device to have access to a first separate video session different from the live video session;
place the first user device into the first separate video session; and
provide a second set of credentials to the first user device, wherein the second set of credentials allows the first user device to have access to the live video session after the first user device has been placed into the first separate video session, wherein the first set of credentials includes a first session ID and a first token and the second set of credentials includes a second session ID and a second token being different from the first session ID and the first token.

24. A computer-implemented method for providing remote access control for a plurality of user devices to participate in a live video session, comprising:
providing a first set of credentials to a first user device upon receiving a request from the first user device to participate in the live video session, wherein the first set of credentials allows the first user device to have access to a first separate video session different from the live video session;
placing the first user device into the first separate video session;
providing a second set of credentials to the first user device, wherein the second set of credentials allows the first user device to have access to the live video session after the first user device has been placed into the first separate video session; and
providing a third set of credentials to a second user device upon receiving a request from the second user device to participate in the live video session, wherein the third set of credentials allows the second user device to have access to a second separate video session.

25. An apparatus for providing remote access control for a plurality of user devices to participate in a live video session, comprising:
a processor; and
a memory communicatively coupled with the processor, wherein the memory includes instructions executable by the processor to cause the apparatus to:
provide a first set of credentials to a first user device upon receiving a request from the first user device to participate in the live video session, wherein the first set of credentials allows the first user device to have access to a first separate video session different from the live video session;
place the first user device into the first separate video session;
provide a second set of credentials to the first user device, wherein the second set of credentials allows the first user device to have access to the live video session after the first user device has been placed into the first separate video session; and
provide a third set of credentials to a second user device upon receiving a request from the second user device to participate in the live video session, wherein the third set of credentials allows the second user device to have access to a second separate video session.

26. A non-transitory computer-readable medium storing computer executable code for providing remote access control for a plurality of user devices to participate in a live video session, the code when executed by a processor causes the processor to:
provide a first set of credentials to a first user device upon receiving a request from the first user device to participate in the live video session, wherein the first set of credentials allows the first user device to have access to a first separate video session different from the live video session;
place the first user device into the first separate video session;
provide a second set of credentials to the first user device, wherein the second set of credentials allows the first user device to have access to the live video session after the first user device has been placed into the first separate video session; and
provide a third set of credentials to a second user device upon receiving a request from the second user device to participate in the live video session, wherein the third set of credentials allows the second user device to have access to a second separate video session.

* * * * *